United States Patent [19]
Mac Pherson et al.

[11] Patent Number: 4,827,717
[45] Date of Patent: May 9, 1989

[54] DAEROHYDROPHASE ENGINE

[76] Inventors: James Mac Pherson, N. 6711 Greenwood Blvd.; Mark Scarpelli, N. 4404 Madison, both of Spokane, Wash. 99205

[21] Appl. No.: 77,124

[22] Filed: Jul. 23, 1987

[51] Int. Cl.$^4$ .............................................. F02K 7/02
[52] U.S. Cl. ..................................... 60/247; 60/39.78
[58] Field of Search ................ 60/39.76, 39.78, 39.79, 60/39.80, 39.81, 247, 269

[56] References Cited

U.S. PATENT DOCUMENTS

| | | | |
|---|---|---|---|
| 2,635,421 | 4/1953 | Blam | 60/247 |
| 2,825,202 | 3/1958 | Bertin et al. | 60/247 |
| 2,920,448 | 1/1960 | Coanda | 60/269 |
| 2,998,703 | 4/1961 | Badders | 60/247 |
| 3,323,304 | 6/1967 | Clobet et al. | 60/269 |

Primary Examiner—Louis J. Casaregola

[57] ABSTRACT

The invention consists of an engine that converts hydrothermomechanical energy into thrust. There is but a single internal moving part . . . the piston. When in operation, the piston preforms two distinct functions: (1) as a valve allowing intermittent injection of a fuel/air mixture for combustion and (2) as a hydraulic fluid pump. Resultant chemical reactions in the combustion chamber produces intermittent high velocity gases at the exit nozzle of the said engine, which provides sufficient thrust for subsonic and sonic aircraft operations. The intermittent thermal activity and specific manner of braking action of the hydraulic fluid, causes the said piston to function as a hydraulic fluid pump. Thereby providing mechanical energy to power cranes, pumps, compressors, generators, etc., etc., and, or provide impetus for aquatic craft and ground vehicles.

1 Claim, 8 Drawing Sheets

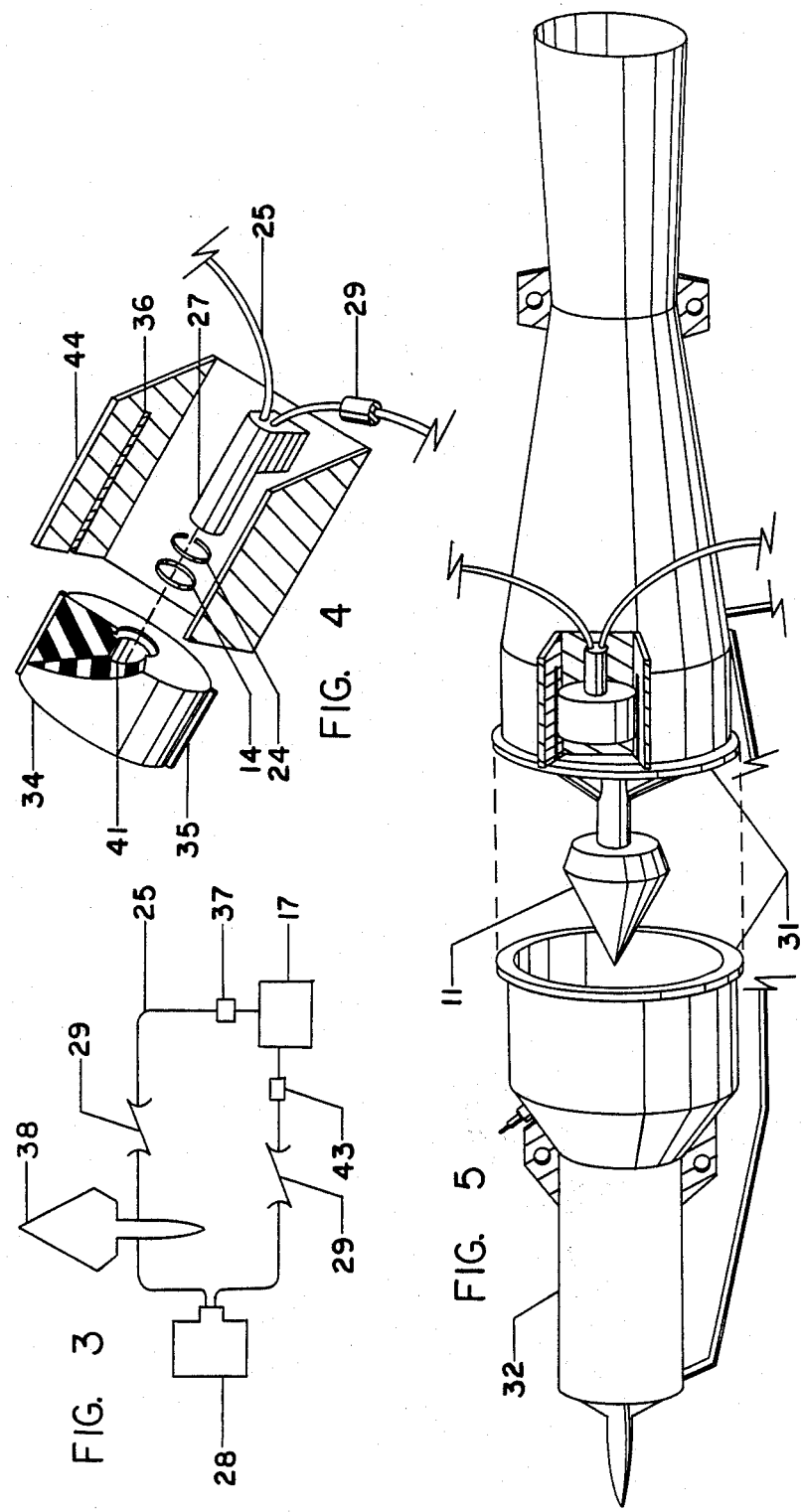

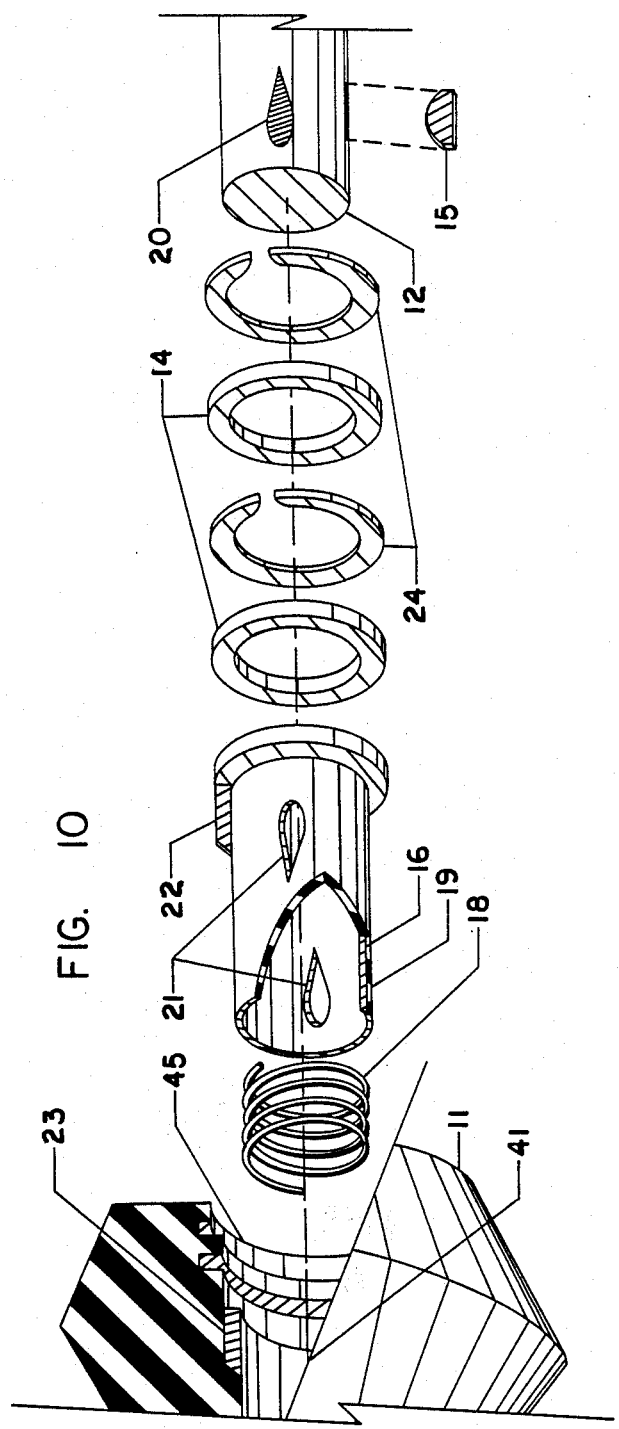

DAEROHYDROPHASE ENGINE

BACKGROUND OF THE INVENTION

There are four main types of aircraft engines: the conventional reciprocating engine, the turbo charged/fuel injected reciprocating engine, the prop jet, and the turbo jet engine. There are also two lesser used types of engines: the ram jet and the pulse jet. There are, of course, several variations of each type. The said four main types of engines have an increasing number of internal moving parts, causing increasing complexity, cost, and requiring increasingly longer durations of time for routine inspections, and parts replacement. The many internal moving parts also increase the chances of malfunction, caused by wear of said parts and from foreign object damage. The said lesser two used types of engines have their own set of draw backs. The ram jet suffers from horrendous fuel consumption at low speeds and requires an auxiliary motor to bring its craft velocity up to a minimum engine operational speed. The pulse jet suffers from excessive noise, vibration, and the valve system is highly unreliable, therfore unsafe for manned craft. The pulse jet also suffers from a decrease of thrust as its craft velocity increases, there by limiting the engines maximum operational speeds. The commonly used fuels are of a slow energy output and high pollution output that decreases the overall effectiveness of all the said engines.

There are four main types of general power plants: the conventional reciprocating engine, the turbo charged/fuel injected engine, the diesel engine, the turbo charged/fuel injected diesel engine, and the lesser used rotary and two cycle engines. There are of course several variations of each engine type. The said four main types of power plants have an increasing number of interacting moving parts, causing increasing complexity, cost, and requiring increasingly longer durations of time for routine inspection and parts replacement. The many internal moving parts also increases the chances of malfunction, commonly caused by wear of said parts and from foriegn object damage. Since potential work energies developed by the afore mentioned power plants is rotational about the drive shaft axies, all the said power plants must be within close proximity of their intended work elements else torrsional stresses will cause rapid fatigue of energy transfer elements. The commonly used fuels are of a low energy and high pollution output that decreases the overall effectiveness of all the afore to said engines.

OBJECT OF THE INVENTION

The Di-phase Engine is a low maintenance, low construction cost, efficient, highly adaptable powerplant which can provide vertual non-polluting power (dependent on fuel) for aircraft. Uses include: power source for drones, (both spy and target practice models) piloted aircraft, and other hybrid flying vehicles.

Since the Di-phase Engine has only a single internal moving part with no metal to metal contact, vehicles equipped with Di-phase Engine could be operated in extreme humidity and experience fewer malfunction due to corrosion by salt and water. The said same vehicles could also operate in arid regions, and experience fewer engine malfunctions caused by sand and dirt abrasion. The many intricate internal moving parts on the said other types of engines are highly susceptible to these types of damage, comparatively.

Another object of the Di-phase Engine is the maximum operational velocity and altitude is determenate on the specific air inlet and exhaust nozzle configuration utilized. Also the maximum thrust of the Di-phase Engine is determenate upon the specific piston head, inlet, exhaust, and combustion chamber configuration, and volume utilized. In other words the invention would allow aircraft to operate at continious super-sonic velocities with out interference with the engines sub-sonic capabilities.

Slight modifications in said Di-phase Engine would permit air breathing engine to operate at extreme altitude for powered trans-atmospheric vehicular operations. There by enabling a runway launchable vehicle to operate in the vacuum of space and in the atmosphere utilizing a single propulsion system.

The Di-phase Engine can be configured to take advantage of the hydraulic power aspect of the engine, via fluid power converters. THe invention can also function at a constant rate producing engery to operate generators, compressors, pumps, cranes, helicopters, etc., etc. A further object would be to provide impetus for ground vehicles and aquatic craft. Another object of the Di-phase Engine is that it was designed to use propane, butane, or methane as primary fuels. Thereby reducing pollution output and the dependance on foreign oils for energy. Because the Di-phase engine is relatively simple to construct, highly skilled technicians and expensive machinery are not needed, unlike the other said engine and power plant types require. The simplicity of design and operation of the Di-phase engine offers excellent field repair and standard maintenance capiblities.

While the above description contains many specificities, these should not be construed as limitations on the scope of the invention, but rather as an exemplification of the numerous embodiments and applications of the invention. accordingly, the scope of the invention should be determined not by the embodiment(s) illustrated, but by the appended claims and their legal equivalents.

DESCRIPTION OF THE DRAWINGS:

Accompanying diagrams illustrate the Di-phase Engine.

FIG. (1) Outside view of engine hull.
FIG. (2) Outside view of engine hull with segment removed.
FIG. (3) Schematic of hydraulic system.
FIG. (4) Exploded view of counter balance assembly.
FIG. (5) Air inlet and combustion chamber assembly.
FIG. (6) Illustration of fuel system.
FIG. (7) Diffuser-diffuser Support member-Fuel injector nozzle
FIG. (8) Convergent-divergent fuel guide-guide support member
FIG. (9) Piston-Shaft-Shaft support unit.
FIG. (10) Exploded view of piston head assembly.

Figure 1:
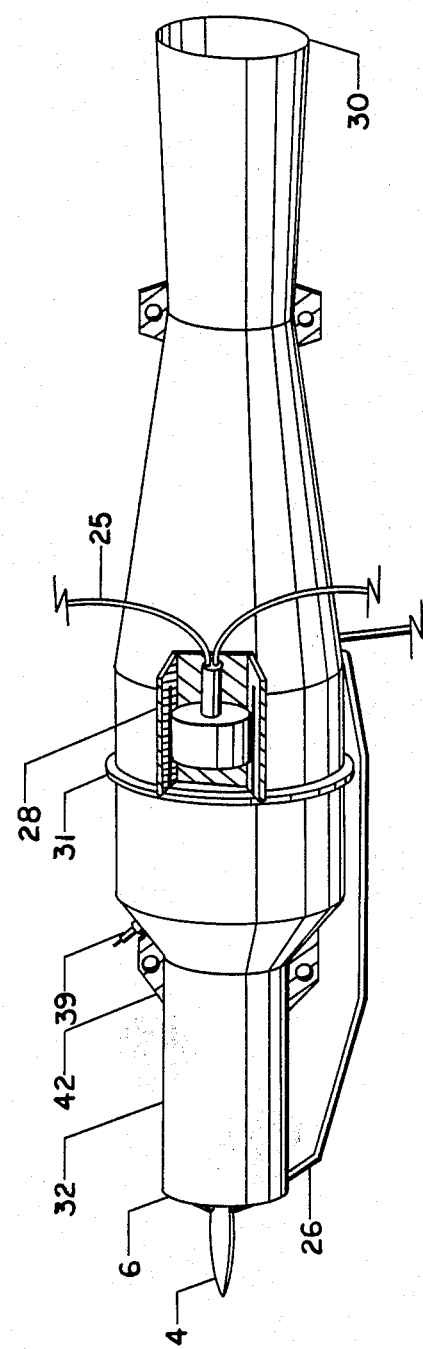
Figure 2:
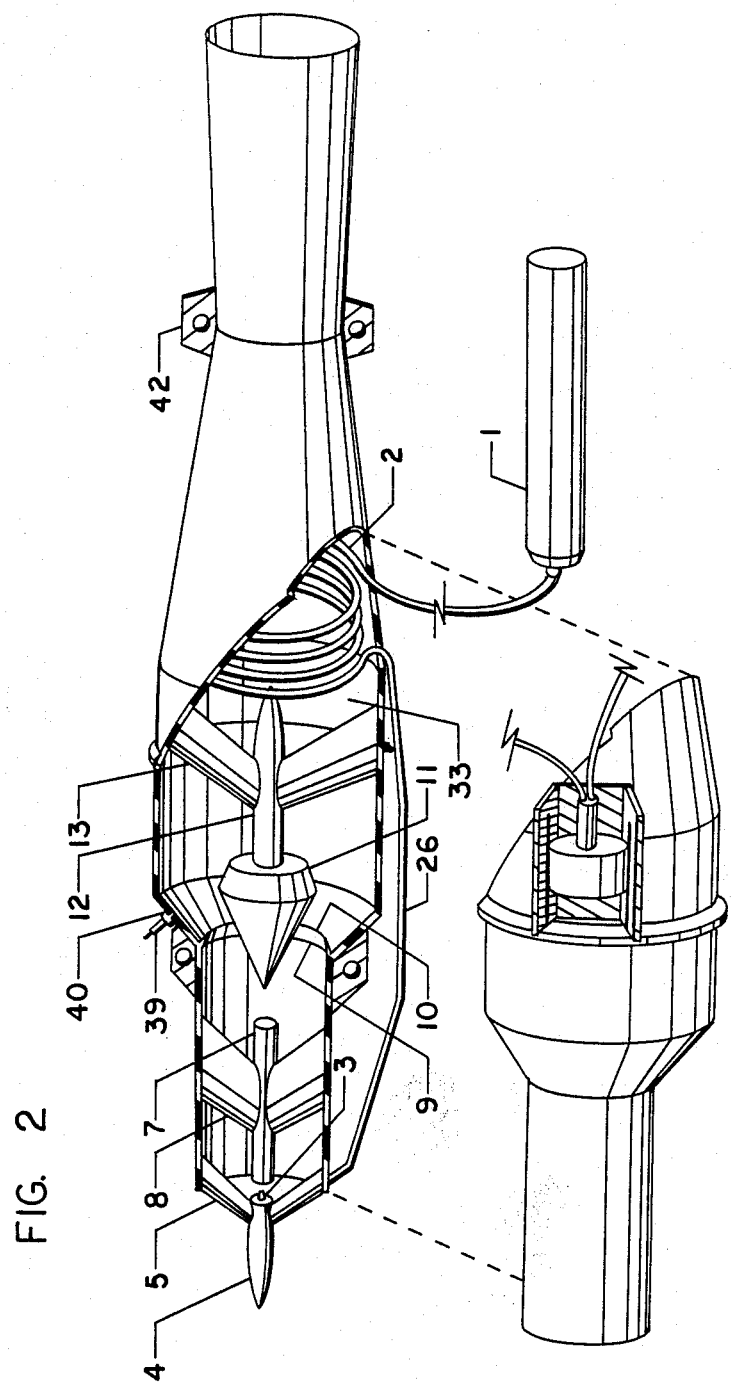
Figure 6:
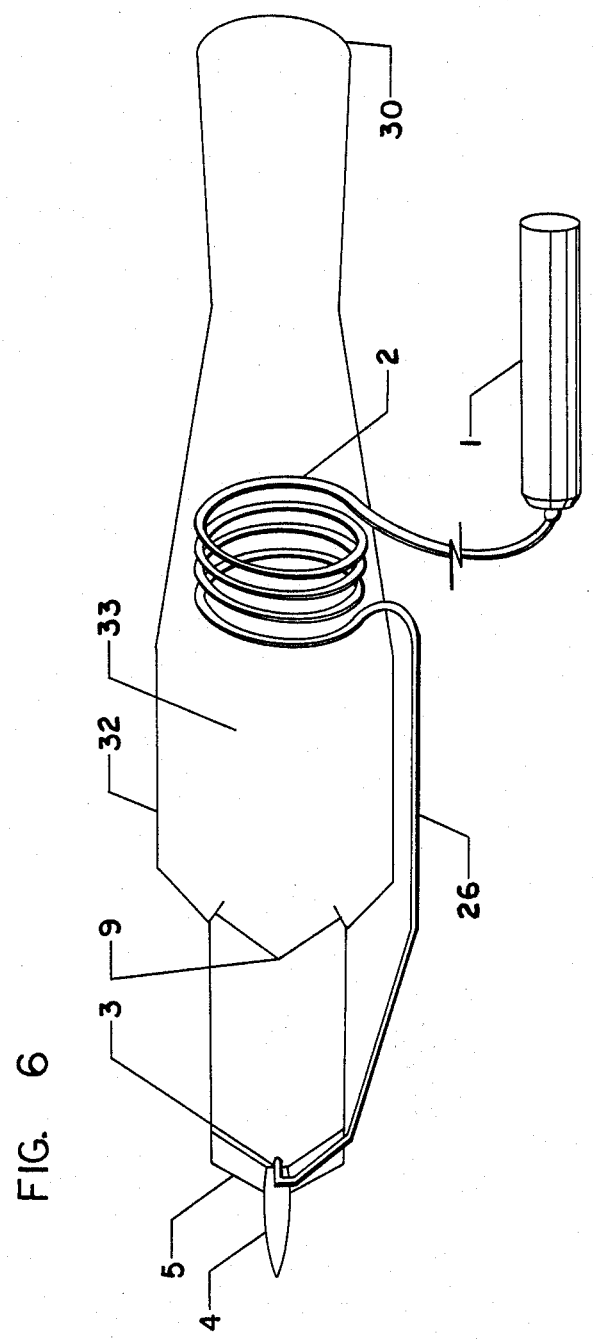
Figure 7:
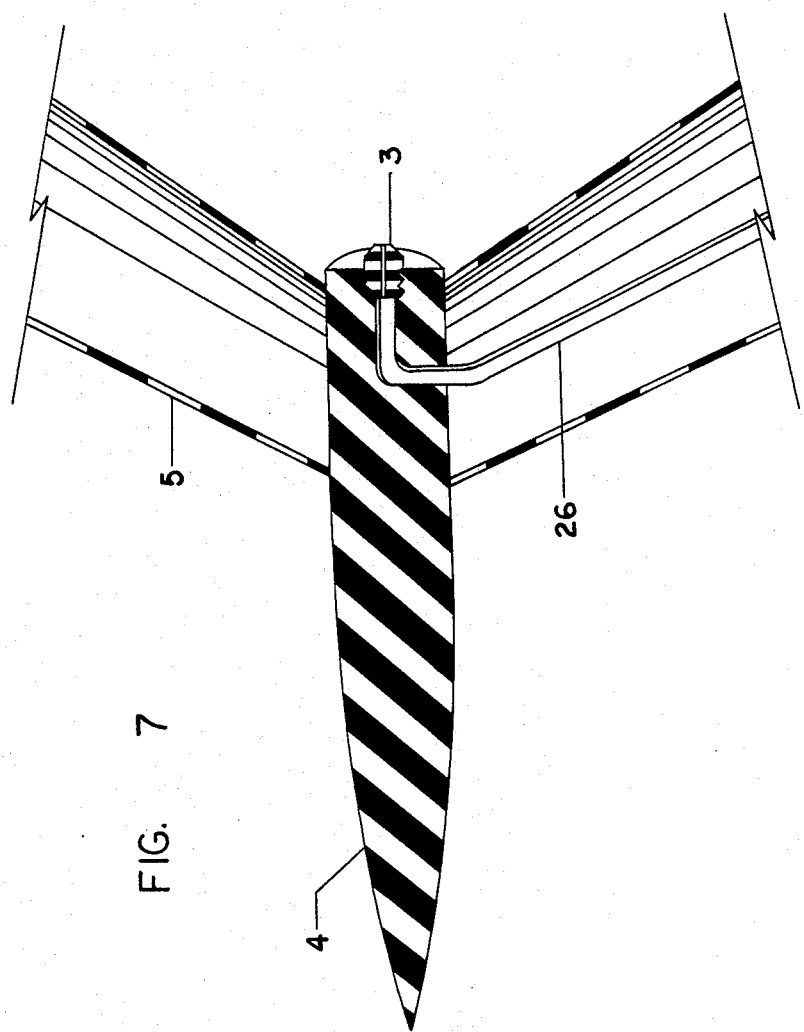
Figure 8:
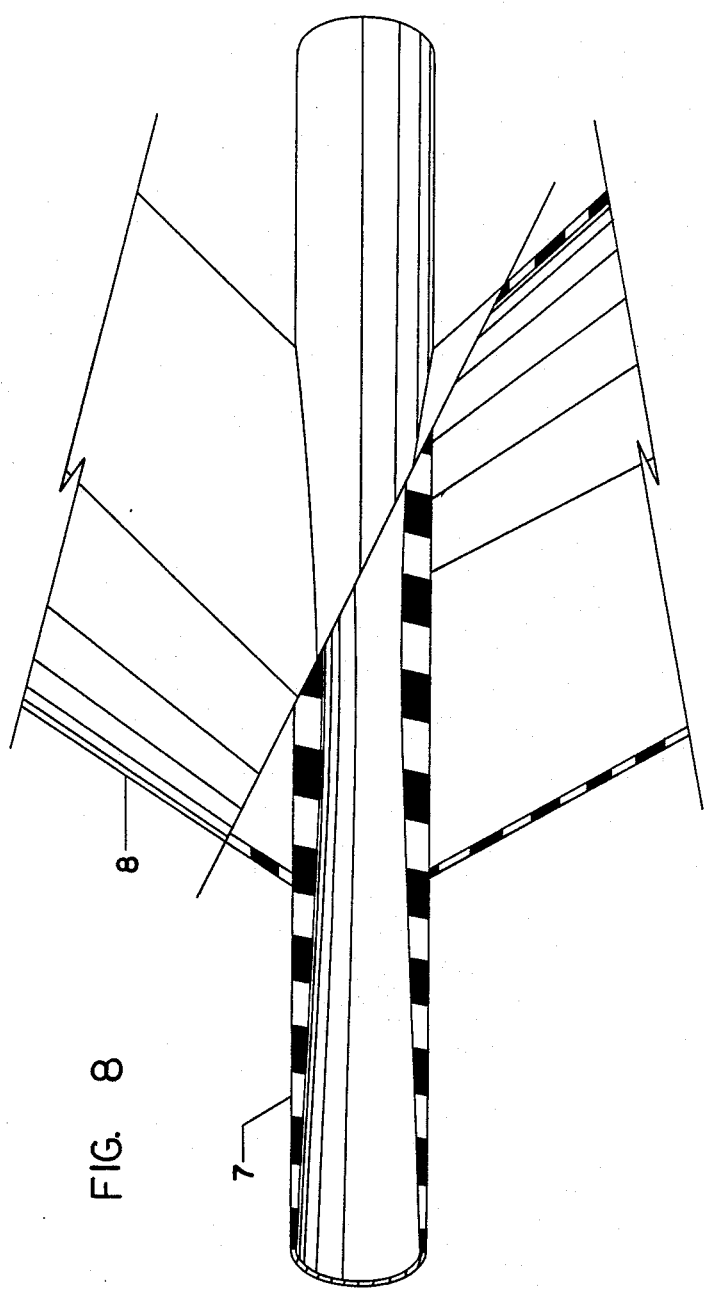
Figure 9:
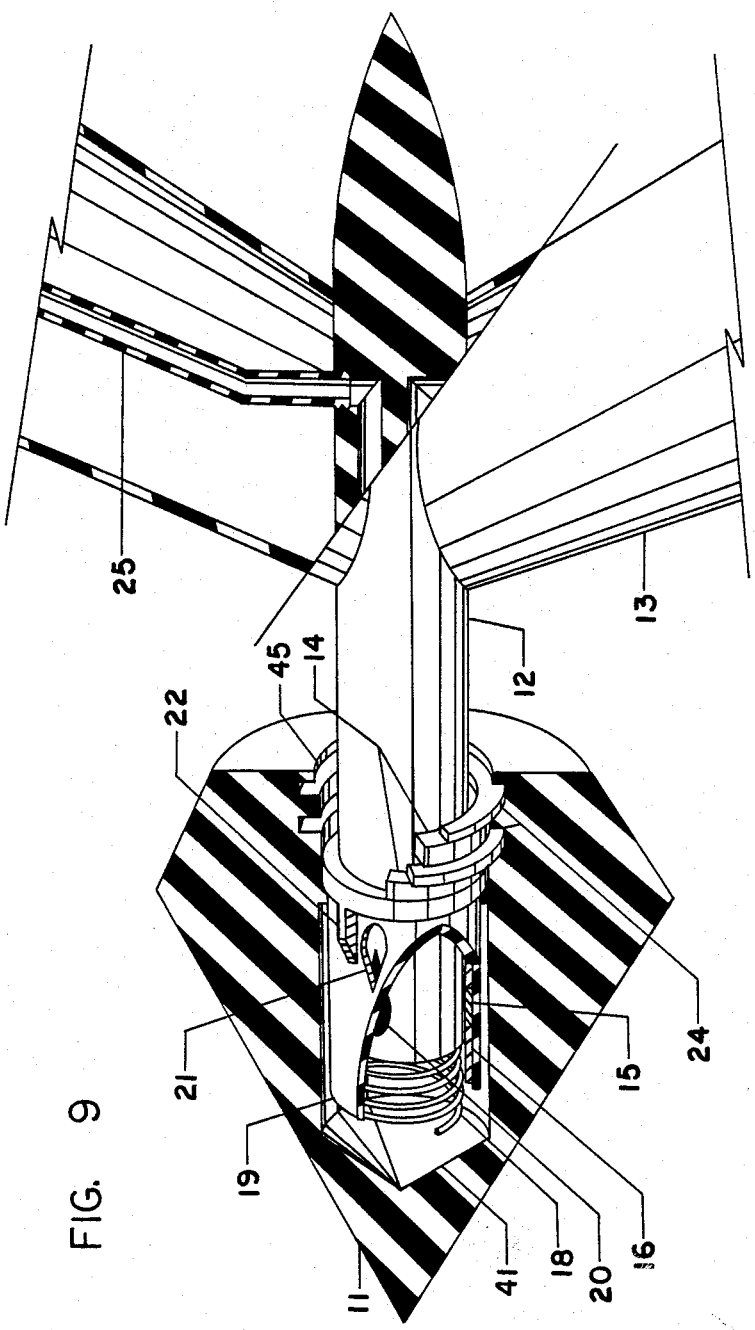

LIST OF INDIVIDUAL ELEMENTS (1) Fuel source
(2) Heat exchanger coil unit
(3) Fuel injector nozzle
(4) Diffuser
(5) Diffuser support member
(6) Engine air inlet (7) Convergent-divergent fuel guide
(8) Fuel guide support member
(9) Deflector ring/flame holder
(10) Combustion chamber inlet
(11) Piston head
(12) Hydraulic flow alternator shaft
(13) Hydraulic flow alternator shaft support member
(14) Gasket
(15) Hydraulic flow alternator shaft/sleeve alignment key
(16) Hydraulic flow alternator sleeve/shaft key way
(17) Hydraulic fluid reservoir
(18) Positive piston opposition spring
(19) Hydraulic flow alternator sleeve
(20) Hydraulic flow alternator shaft port
(21) Hydraulic flow alternator sleeve port
(22) Hydraulic flow alternator sleeve/piston alignment key
(23) Piston/hydraulic flow alternator sleeve alignment guide
(24) Securing ring
(25) Hydraulic fluid line
(26) Fuel line
(27) Counter balance hydraulic fluid shaft
(28) Counter balance unit assembly
(29) One-way hydraulic fluid check valve
(30) Jet exhaust nozzle
(31) Coupling ring
(32) Di-phase engine hull
(33) Combustion chamber
(34) Counter balance mass
(35) Counter balance mass key
(36) Counter balance mass key way
(37) Hydraulic fluid power access port
(38) Piston assembly
(39) Ignitor plug
(40) Ignitor plug resceptical
(41) Hydraulic cylinder
(42) Engine mounting point
(43) Head pressure relief valve
(44) Counter balance assembly platform
(45) Securing ring recesses

DESCRIPTION OF INVENTION OPERATION

Fuel is metered into the Di-Phase Engine heat exchanger(2) from the fuel source(1). The heat exchanger (2) pre-heats the said fuel to supplement ignition and increase the velocity of the fuel at the injector nozzle(3). The fuel is then directed through the convergent-divergent fuel guide(7) assembly. As the said fuel reaches sonic velocities in the convergent-divergent fuel guide(7), air is drawn in the engine air inlet(6) by creation of a vacuum at the combustion chamber inlet(10). The high-speed mixture of fuel and air forms a pressure barrier between the trailing edge of the deflector ring/flame holder(9) and the piston head(11) partially closing the combustion chamber inlet(10) from the engine air inlet(6) and establishing the internal fuel/air flow pattern. The initial ignition is provided by ignitor plugs(39) mounted on the hull of the combustion chamber(33). The exploding gases aft of the piston head(11) move said piston head (11) outward to the closed position further sealing the engine air inlet(6) from the combustion chamber(33). The sudden outward motion of the piston head(11) creates a shock wave between said piston head(11) and the deflector ring/flame holder(9), effectively preventing exhaust gases from intering the Di-phase Engine air inlet(6). Also, preventing reversed thrust and metal to metal contact of said deflector ring(9) and said piston head(11) components. The remaining majority of exploding gases are forced through the exit nozzle(30) at sonic velocities creating thrust. The exited gases thereby reduce the pressure in the combustion chamber(33) and create a vacuum. The pressure increases in the convergent-divergent fuel guide(7) and the engine air inlet(6). This is due to the entering high velocity fuel/air mixture and, the closing of the combustion chamber inlet(10), by the piston head(11) motion, and the resultant shock wave. The combined forces of pressure in the inlet, forward of the piston head(11), and vacuum aft of the piston head(11) provide the forces which move the piston head(11) inward, to the open position; (Thus, allowing a fresh charge of fuel and air to enter the combustion chamber(33)). As some residual hot expended gases remain in the combustion chamber, ignition occurs automaticly; Thus, enabling the process to repeat itself for continuous operation. As flight speeds increase and air inlet(6) configuration permitting, the piston head(11) stroke and reciprocating rate decreases so that engine operation ressembles that of a ram jet. Introduction of an oxidizer as the atmospheric pressure and density decreases with altitude, engine operation ressembles that of a rocket engine.

The said outward and inward motion of the piston head(11) causes a pumping of hydraulic fluid(25). The movement of the piston head(11) creates an alternate increase and decrease in the hydraulic cylinder(41) volume. As said piston head(11) moves outward, the volume avilable in the hydraulic cylinder(41) increases, and fluid enters through the inlet oneway Check valve(29). As the piston head(11) moves inward, the volume avilable in said hydraulic cylinder(41) decreases, the pressure of the fluid increases and the fluid is forced through the outlet one-way check valve(29). The pumping of the hydraulic fluid simultaneously activates the counter-balance unit(28), which dampens operational vibrations caused by the reciprocating action of the piston head(11) assembly. When the alternate thermal activity of the combustion process is combined with a decreasing hydraulic fluid flow rate; scissor action of the hydraulic flow alternator sleeve port(21) and the hydraulic flow alternator shaft port(20) allows, and gradually slows the motion of the piston head(11) in either direction of travel. The fluid in conjunction with the decreasing flow rate, acts as piston head(11) motion damper, and the motion of the piston head(11) on the fluid acts as a hydraulic fluid pump. The pumping rate varies from zero at the point at which the piston head(11) changes direction to a maximum when the piston head(11) is approximately half through its stroke.

We claim:
1. A Di-phase Engine comprising:
(a) a basic areodynamic configuration defined by an assembly of rigid, heat resistant, conical and cylindrical pieces forming an air inlet, a deflector ring, a flame holder, a combustion chamber, and an exit nozzle;
(b) a support member which provides protection for a fuel line extending from a fuel heat exchanger unit to a diffuser, the diffuser including a fuel line receptical, a fuel injector nozzle receptical, and an appropriately configured fuel injector nozzle, with the diffuser and included fuel system elements being centered and secured at the engine inlet;

(c) a centered, convergent-divergent fuel guide located aft of the diffuser inside the engine inlet and forward of the leading edge of the deflector ring;
(d) a flame holder secured aft of the deflector ring and an alternator shaft support member in which is centered a hydraulic flow alternator shaft, the shaft comprising an offset hydraulic fluid port, a hydraulic flow alternator sleeve guide key, and a hydraulic fluid line;
(e) a piston head assembly comprising a piston head, a positive piston opposition spring, a sleeve/piston head key way, a securing ring recess, and a hydraulic flow alternator sleeve, the sleeve comprising an offset hydraulic fluid port, a hydraulic flow alternator shaft key way, a gasket, a securing ring, and a piston/sleeve guide key, the piston head assembly being slidably mounted on the alternator shaft;
(f) a heat exchanger unit, comprising a circulation element; a support member, and an entery/exit header located for optimum thermal efficiency;
(g) a fluid exit line connecting the hydraulic flow alternator shaft with a counter-balance assembly, the counter-balance assembly comprising a counter-balance platform, a counter-balance mass, a hydraulic flow shaft with a hydraulic flow aperature, fluid entery and exit ports, a gasket, a securing ring, and a fluid exit line including a one-way check valve, the entire counter-balance assembly being secured to the engine hull;
(h) a main hydraulic fluid reservior connected via a hydraulic fluid metering device and a one-way check valve to the inlet of the hydraulic flow alternator shaft;
(i) an ignitor plug mounted to the combustion chamber to provide intial combustion of the fuel/air mixture that enters the combustion chamber via the fuel guide and engine air inlet;
(j) a fuel supply source with an appropriate fuel metering device connected to the fuel heat exchanger unit and fuel line; and
(k) a fuel comprising propane, butane, methane, or the like to be utilizied to operate the engine in a non-polluting manner.

* * * * *